United States Patent

[11] 3,593,179

[72] Inventors Paulus Joseph Maria Hovens; Wouter Smeulers, both of Emmasingel, Eindhoven, Netherlands
[21] Appl. No. 868,300
[22] Filed Oct. 22, 1969
[45] Patented July 13, 1971
[73] Assignee U. S. Philips Corporation New York, N.Y.
[32] Priority Oct. 31, 1968
[33] Netherlands
[31] 68/5507

[54] PHASE DISCRIMINATOR FOR SYNCHRONIZING A LOCAL OSCILLATOR
10 Claims, 1 Drawing Fig.

[52] U.S. Cl. 331/8, 178/69.5 TV
[51] Int. Cl. H03b 3/04
[50] Field of Search 331/8; 178/69.5

*Primary Examiner*—John Kominski
*Attorney*—Frank R. Trifari

ABSTRACT: A phase discriminator for synchronizing a local oscillator, particularly for the synchronization of the line deflection in a television receiver. The discriminator is provided with a semiconductor switch and a control stage connected to a control electrode of the switch. The control stage provides, under the influence of an external synchronizing signal applied thereto, a switching signal having short switching pulses relative to a reference potential for closing the semiconductor switch. A source for supplying a comparison signal derived from the oscillator signal can be connected through the switch to a capacitor which conveys a control voltage for a frequency control stage of the oscillator. The discriminator further comprises a peak rectifier circuit having a terminal to which the source is connected. The peak rectifier circuit includes a potential divider which provides a threshold in the comparison signal relative to the reference potential occurring in the switching signal which is applied to the control electrode of the switch by the control stage during the absence of switching pulses; the threshold introduced in the comparison signal maintaining the semiconductor switch open during the absence of switching pulses.

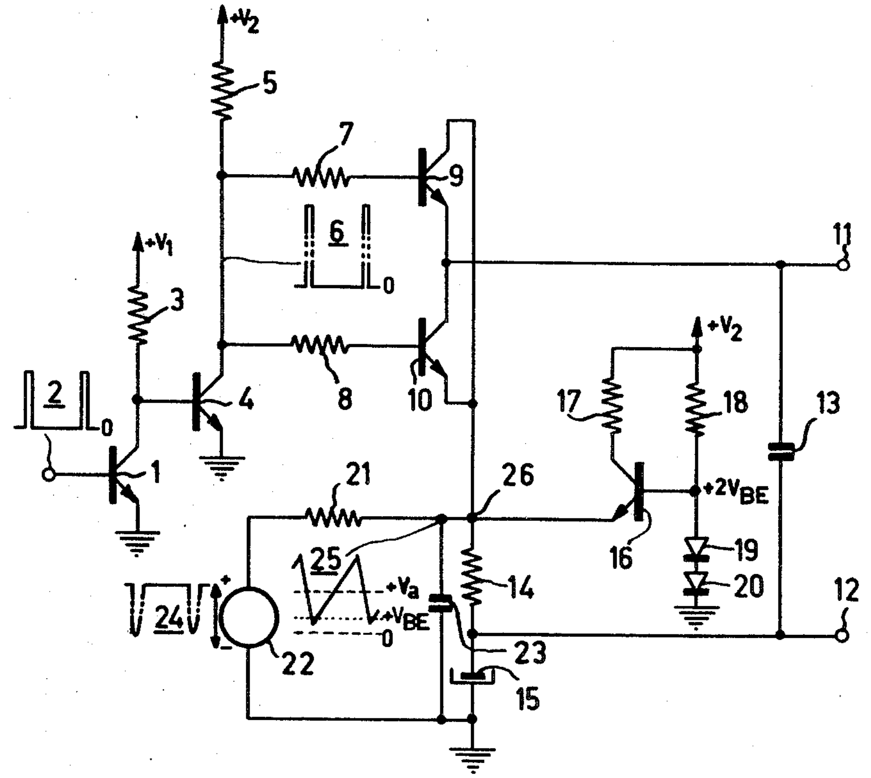
INVENTORS
PAULUS J. M. HOVENS
WOUTER SMEULERS
BY
AGENT

PHASE DISCRIMINATOR FOR SYNCHRONIZING A LOCAL OSCILLATOR

The invention relates to a phase discriminator for synchronizing a local oscillator which discriminator is provided with a semiconductor switch and a control stage connected to a control electrode of the switch, which control stage provides, under the influence of a synchronizing signal applied thereto, a switching signal having short switching pulses relative to a reference potential for closing the semiconductor switch, and a source for supplying a comparison signal derived from the oscillator signal which source can be connected through the switch to a capacitor which may convey a control voltage for a frequency control stage of the oscillator.

Such a phase discriminator is known from U.S. Pat. Specification 2,906,818 in which a television receiver is mentioned as a possible field of application. In the television receiver the synchronizing signal for the line deflection is separated from a video signal with the aid of an amplitude limiter which forms part of the control stage. The control stage supplies switching pulses for the semiconductor switch which is formed as a symmetrical transistor. The pulses are applied to a base electrode serving as a control electrode of the transistor. Two other electrodes may each serve as emitter and collector electrodes, dependent on the amplitude of the impressed voltage relative to that applied to the base electrode. One electrode is connected to the source supplying a comparison signal varying in a sawtooth form, which source may comprise the line oscillator and the line output stage. The other electrode is connected to the capacitor which conveys the control voltage for the frequency control stage of the line oscillator.

In the television receiver the video signal is applied to a control grid of a triode in cathode follower arrangement. The resistor included in the cathode lead is connected through a capacitor to the base electrode of the symmetrical transistor and to one end of a resistor whose other end is connected to a terminal of a battery; thus an amplitude limiter is formed. Synchronizing pulses in the video signal cause the symmetrical transistor to be bottomed. During bottoming of the PNP-transistor, a charge is applied to the capacitor of the amplitude limiter through the emitter base circuit of the transistor, which charge flows away through the leakage resistor during the cutoff condition of the transistor. During bottoming of the symmetrical transistor the comparison signal influences the control voltage for the frequency control stage. For a satisfactory line synchronization, that is to say, the switching pulses occur at half the flyback in the comparison signal varying in a sawtooth form, the mean value of the control voltage is not varied. However, in case of an incorrect line synchronization the mean value of the control voltage is varied in such a manner that the frequency control stage readjusts the oscillator to a satisfactory synchronization.

As is described in the said Patent Specification a temporary absence of the synchronizing pulses has the result that the threshold voltage in the amplitude limiter varies. As a result the comparison signal may cause the symmetrical transistor to be bottomed at an arbitrary instant for a higher value than that which corresponds to the decreasing threshold voltage, and it may influence the control voltage, while the control stage does not supply any switching pulses. The result would be that the phase and the frequency of the oscillator which should remain constant, would vary.

To prevent the foregoing the known phase discriminator is provided with a feedback. A portion of the comparison signal in the feedback is applied to a tapping on the resistor formed as a potential divider in the cathode lead of the said triode. The phase and the amplitude are then such that in the absence of the synchronizing pulses the symmetrical transistor conducts current in one direction during the first half of a line period, and conducts current in the other direction during the second half of this period. The overall charge transport in an entire line period must then be zero in order that the mean value of the control voltage across the capacitor is not influenced.

As already stated in the relevant Patent Specification the transistor active as a switch should have a more or less ideal symmetrical characteristic for a satisfactory operation of the phase discriminator. To eliminate the influence of the asymmetry which is substantially always present, it has been proposed to adapt the form of the fed back comparison signal. In practice, all this is difficult to realize owing to the divergence in the extend of asymmetry of the transistors.

It is evident that the amplitude of the comparison signal which is applied in a direct manner and through the feedback to the transistor, must be small. In fact, it follows from considerations of dissipation that the voltage across the transistor should be small when the transistor is bottomed during the entire line period. The limit therefor may already be at a few mV.

It is an object of the present invention to obviate, inter alia, the said drawbacks and to provide a phase discriminator which operates at a high efficiency and whose satisfactory operation is ensured in an automatic manner independently of divergence magnitudes of the components. To this end the phase discriminator according to the invention is characterized in that the source for supplying the comparison signal is connected to a terminal of a peak rectifier circuit including a potential divider which potential divider provides in the comparison signal a threshold relative to the reference potential occurring in the switching signal which is applied to the control electrode of the switch by the control stage during the absence of switching pulses, the threshold introduced in the comparison signal maintaining the semiconductor switch open during the absence of switching pulses.

The invention is based on the recognition of the fact that the said peak rectifier circuit automatically ensures the most favorable adjustment of the phase discriminator. The optimum peak-to-peak value of the comparison signal may be so great that the characteristic of the semiconductor switch is substantially entirely utilized. During the absence of synchronizing pulses it is then ensured that the semiconductor switch is open under all circumstances so that the control voltage across the capacitor remains constant. Said absence of the synchronizing pulses may relate to both the interval between two successive pulses and to the temporary absence of pulses for several periods.

In order that the invention may be readily carried into effect, an embodiment thereof will now be described in detail by way of example, with reference to the accompanying diagrammatic drawing.

The FIG. shows a phase discriminator according to the invention in which the reference numeral 1 denotes a transistor. A synchronizing signal 2 drawn as a function of time is applied to a base electrode of transistor 1. The synchronizing signal 2 is supplied, for example, by a synchronizing separator (not shown) provided in a monochrome or color television receiver which separator separates the line synchronizing pulses from a video signal. As is shown for approximately one line period pulses occur in the synchronizing signal 2, which extend in a positive direction from the ground potential denoted by the reference O.

An emitter electrode of transistor 1 is connected to ground while a collector electrode is connected through a resistor 3 to a terminal conveying a potential $+V_1$. The collector electrode of transistor 1 is connected to a base electrode of a transistor 4, an emitter electrode of which is connected to ground. A collector electrode of transistor 4 is connected through a resistor 5 to a terminal conveying a potential $+V_2$.

Transistor 1 is cut off during the interval between the pulses in the synchronizing 22. The potential $+V_1$ and the resistor 3 are proportioned in such a manner that the potential on the base electrode of transistor 4, in case of a cutoff transistor 1, is higher than the base-emitter threshold $V_{BE}$ (junction voltage) of transistor 4, so that this transistor is bottomed. The pulses in the synchronizing signal 2 cause the transistor 1 to be bottomed. The voltage drop then occurring across the transistor 1 is smaller than the said base-emitter threshold $V_{BE}$ of transistor 4 so that this transistor is then cut off. The result is that a signal 6 having short pulses occurs at the collector electrode of transistor 4. Apart from the small voltage drop across the bottomed transistor 4, the pulses in signal 6 extend from the ground potential to approximately the potential $+V_2$.

The collector electrode of transistor 4 is connected through resistors 7 and 8 to the base electrodes of transistors 9 and 10, respectively. An emitter electrode of transistor 9 is connected to a collector electrode of the transistor 10 which is of the same conductivity type. Transistors 9 and 10 are, for example, of the NPN-conductivity type. The junction is connected to an output terminal 11 of the phase discriminator. A second output terminal 12 of the discriminator is connected through a capacitor 13 to the first output terminal 11. Output terminal 12 is connected through a resistor 14 to an interconnection between the collector electrode of transistor 9 and the emitter electrode of transistor 10. The end of resistor 14 connected to the output terminal 12 is connected to ground through an electrolytic capacitor 15. The other end of resistor 14 is connected to an emitter electrode of a transistor 16 a collector electrode of which is connected through a resistor 17 to a terminal conveying the potential $+V_2$. A base electrode of transistor 16 is connected to the potential divider which is built up from a resistor 18 to the terminal conveying the potential $+V_2$ and two series-arranged diodes 19 and 20 to ground. The anode of diode 19 is connected to resistor 18, while the cathode of diode 20 is connected to ground. The voltage drop across the diodes 19 and 20 and hence the potential on the base electrode of the transistor 16 is denoted by $+2v_{BE}$.

A series arrangement of a resistor 21 and a signal source 22, as well as a capacitor 23 are connected in parallel with the series arrangement of resistor 14 and capacitor 15. Signal source 22 provides a pulsatory signal 24 from which a signal 25 is obtained after integration with the aid of the integrating network 21, 23. Consequently a voltage varying in a sawtooth form across capacitor 23 is shown in signal 25. Signal source 22 may include a winding which is provided on an output transformer in a line output stage in the television receiver not shown. The line output stage is controlled by a line oscillator which is provided with a frequency control stage connected to the output terminals 11 and 12 of the phase discriminator. In this manner the sawtooth varying voltage in the signal 25 represents a comparison signal derived from the oscillator signal which comparison signal is applied by a source including components 21, 22 and 23 to a terminal denoted by the reference numeral 26.

To explain the function of the components in the phase discriminator it is to be noted that the components 14 to 21 inclusive constitute a peak rectifier circuit for the comparison signal 25. The asymmetric NPN transistors 9 and 10 serve as a semiconductor switch and together replace one symmetrical NPN transistor. The base electrodes of the transistors 9 and 10 jointly serves as a control electrode of the semiconductor switch (9, 10). The reference numerals 1 to 8 inclusive are associated with a control stage which generates a switching signal 6 having short switching pulses for the semiconductor switch (9, 10).

To explain the operation of the phase discriminator, the starting point is the following fact: the capacitor 13 applies a voltage to the output terminals 11 and 12 such that upon supply to a frequency control stage of an oscillator of a line deflection circuit a comparison signal 25 derived therefrom is the result which does not vary the control voltage across capacitor 13. The condition of synchronization has been achieved. The television receiver is then synchronized in the correct manner for the line deflection, and the instant of the center of a pulse in the synchronizing signal 2 corresponds to that of a pulse in the signal 24. For the signal 25 there applies that the pulses in the signal 6 occur at half the flyback of the sawtooth voltage across capacitor 23.

The pulses in the switching signal 6 give the transistors 9 and 10 the opportunity to become bottomed. Of course the potential on the collector electrodes of the NPN-transistors 9 and 10 must then be higher than that at the emitter electrodes. In the condition of synchronization the potential on the terminal 26 is decreasingly slightly higher than that on the terminal 11 for the first half of the duration of a switching pulse in the signal 6, so that transistor 9 is bottomed. For the second half of the duration of the switching pulse the potential on terminal 26 becomes increasingly slightly lower than that on terminal 11, so that transistor 10 is bottomed. The result is that in the first half of the pulse duration a slight charge is applied to the capacitor 13 which charge is removed again in the second half.

It is evident that during the interval between two switching pulses in the signal 6, the transistors 9 and 10 are certainly not to be bottomed. In fact, the result would be that the control voltage across capacitor 13 would be varied, which would be inadmissible since it was stated that the condition of synchronization had been reached. During the said interval the control stage (1—8) impresses approximately the ground potential on the base electrodes of the transistors 9 and 10. As a result the emitter electrode of transistor 10 must never reach the ground potential or, considering the base-emitter threshold $V_{BE}$, a slightly lower potential value. To obtain an assuredly satisfactory operation of the discriminator without the components 14 to 20 inclusive, it is required that a bias voltage be impressed on the emitter electrode of transistor 10. This bias voltage must be so high that the potential on the emitter electrode of transistor 10 never approaches that of the base electrode at the greatest possible amplitude in a negative sense of the comparison signal 25. The admissible highest potential on the emitter electrode of transistor 10 is limited by the breakdown voltage between the emitter and the base. The result is that on the one hand a high bias voltage is required and on the other hand only a limited variation is admissible in the amplitude of the comparison signal 25. The amplitude variation, inter alia, emanates from the fact that with the same phase and frequency of the signal provided by the line oscillator the amplitudes of the pulses in the signal 24 may vary as a function of the load of the line output stage. In addition there applies that providing a phase discriminator in one of the bulk-manufactured television receivers, in which the tolerances of the components used are great, has the result that the amplitude of the comparison signal 25 may lie between wide limits.

In the phase discriminator according to the invention a varying bias voltage is generated which is dependent on the amplitude of the comparison signal 25 and which is automatically maintained at the smallest possible value. To this end the potential divider including resistor 18 and the diodes 19 and 20 impresses the potential $+2v_{BE}$ on the base electrode of the transistor 16 in the peak rectifier circuit (14—21). Starting from a base-emitter threshold of $+V_{BE}$, transistor 16 will be bottomed when the emitter electrode conveys a potential $+V_{BE}$. The result is that the potential on terminal 26 cannot become smaller than $+V_{BE}$. A dotted line shows the potential $+V_{BE}$ in the comparison signal 25. Transistor 16 is bottomed about the minimum value of the sawtooth in the comparison signal 25, and the sawtooth is flattened as is shown by the black triangles in signal 25. A broken line denotes the mean potential $+V_a$ in signal 25 which potential occurs on the terminal of capacitor 15 connected to the output terminal 12, dependent on the amplitude of the sawtooth in signal 25. The leakage resistance of capacitor 15 is given by the resistors 14 and 21. The voltage source 22 formed, for example, with a winding on a transformer forms a short circuit.

The absence of the synchronizing pulses in the signal 2 for many line periods cannot influence the control voltage across the capacitor 13. In fact, the comparison signal 25 in cooperation with the peak rectifier circuit (14—21) maintains the semiconductor switch (9, 10) open. As a result the frequency of the line oscillator will remain constant, for example, when switching the television receiver from one television channel to another television channel. It is only necessary to readjust the phase of the line deflection for the same line frequency of both television channels.

The potential divider in the peak rectifier circuit (14—21) may be formed with one diode only, for example, diode 19. As a result the smallest possible potential on terminal 26 will be fixed on the ground potential 0. If, however, the base-emitter threshold of transistor 10 is negligibly small, whereas the voltage drop across the bottomed transistor 4 is not negligible, then transistor 10 could be bottomed beyond the duration of the switching pulse. With a view to the spread in magnitudes of the transistors used, the threshold in the comparison signal 25 has been fixed at the $+V_{BE}$ level so that the influence of the spread is eliminated.

The tapping on the potential divider (18–20) which conveys the potential $+2v_{BE}$ may be connected to the resistor 3. It is only necessary for the potential $+V_1$ to be so high that for a cutoff transistor 1, a potential slightly higher than $+V_{BE}$ is impressed on the base electrode of the bottomed transistor 4.

The semiconducting elements in the potential divider (18—20) formed as diodes 19 and 20 may be replaced by a resistor. The use of diodes provides the advantage that variations in the potential $+V_2$ do not substantially influence the threshold $+2v_{BE}$.

The sawtooth part in the comparison signal 25 is derived from the pulsatory signal 24 supplied by source 22 with the aid of the integrating network comprising resistor 21 and capacitor 23. Source 22 may be formed as a winding on the transformer in the line output stage of a television receiver. The comparison signal 25 may alternatively be derived by means of differentiation from a parabola signal. A tangent or S correction capacitor in series with a line deflection coil in the line output stage may be used as a source for the parabola signal. Capacitor 23 could be omitted in the Figure and resistor 21 could be replaced by a capacitor which in cooperation with the resistor 14 provides a differentiating network. A leakage resistor should have to be provided in parallel with the capacitor 15, since the discharge through the capacitive source would be impossible.

It is evident that the source 22 may provide a signal which is derived from the line output stage or directly from the controlled line oscillator. It is then not necessary for the comparison signal 25 to show any sawtooth variation. Other functions are alternatively possible.

The phase discriminator can largely be integrated in a semiconductor body in a simple manner. To this end the switch (9, 10) is indicated by two NPN-transistors arranged in symmetrical transistor configuration. The diodes 19 and 20 may be formed as series-arranged NPN-transistors, wherein a base electrode of each of the two transistors is interconnected to a collector electrode. The rectifier provided in the peak rectifier circuit is shown as transistor 16, but may alternatively be formed as a diode. The discrete capacitors 13, 15 and 23, and the resistors 14, 21 may be connected to a, for example, monolytically integrated circuit.

The following values of the components are given for a monolytically integrated embodiment of a discriminator according to the invention:

Potential $+V_2$ = 12 v.
Potential $+V_1 = +2v_{BE}$
Signal 25 = $3v_{pp}$ sawtooth
Resistor 3 = 2.6 k.ohms.
Resistor 5 = 9.2 k.ohms.
Resistors 7, 8 = 1.5 k.ohms
Resistor 14 = 680 ohms
Resistor 17 = 650 ohms
Resistor 18 = 8.1 k.ohms
Resistor 21 = 2.7 k.ohms
Capacitor 13 = 0.068 $\mu$f.
Capacitor 15 = 10 $\mu$f.
Capacitor 23 = 0.1 $\mu$f.

What we claim is:

1. A phase discriminator for synchronizing a local oscillator comprising a semiconductor switching means, a control stage connected to the control electrode of said switching means for receiving external synchronizing signals and producing a switching signal therefrom, said switching signal comprising short switching pulses having amplitudes relative to a reference potential for closing said switching means, said reference potential being the potential applied to the control electrode of said switching means during the absence of switching pulses, a source of comparison signals connected to said switching means, said comparison signals being derived from said local oscillator, the closing of said switching means producing a control voltage representing the phase relationship between said switching and comparison signals, a peak rectifier circuit connected between said source and said switching means and comprising a potential divider that establishes a threshold level in the amplitude of said comparison signals relative to said reference potential for maintaining said switching means open during the absence of switching pulses, a capacitor for receiving said control voltage, and frequency control means connected between said capacitor and said source for using said control voltage to vary the frequency of said source to minimize differences in the phase relationship between said synchronous and comparison signals.

2. A phase discriminator as claimed in claim 1 wherein said switching means comprises a first and second transistor of the same type having bases connected to said control stage, the emitter of the first transistor connected to the collector of the second transistor and the collector of the first transistor connected to the emitter of the second transistor.

3. A phase discriminator as claimed in claim 1 wherein said control stage comprises a first transistor in cascade with a second transistor, said first transistor being cut off and said second transistor bottoming when said synchronizing signals are absent and said first transistor bottoming and second transistor being cut off when said synchronizing signals are present.

4. A phase discriminator as claimed in claim 3 wherein the emitter of the first transistor and the collector of the second transistor of said switching means is connected to said capacitor and the collector of the first transistor and the emitter of the second transistor of said switching means is connected to said peak rectifier circuit.

5. A phase discriminator as claimed in claim 1 comprising a series arrangement of said switching means and a resistor in parallel with said capacitor, the junction of said resistor and said capacitor being connected to a terminal of a charge capacitor, the junction of said resistor and said switching means being connected to said peak rectifier circuit.

6. A phase discrimination as claimed in claim 5 wherein said source is in parallel with the series arrangement of said resistor and said charge capacitor.

7. A phase discriminator as claimed in claim 1 wherein said peak rectifier circuit further comprises a rectifier in series with said potential divider, said potential divider being a series resistor arrangement comprising at least one semiconductor parameter.

8. A phase discrimination as claimed in claim 1 wherein said source comprises a pulsatory voltage source in parallel with an integrating network, said network comprising a series arrangement of a resistor and capacitor, said junction between said resistor and said capacitor being connected to said peak rectifier circuit.

9. A phase discriminator as claimed in claim 1 wherein said control stage, said switching means, said source and said frequency control means are integrated within a semiconductor body.

10. A television receiver with a phase discriminator for synchronizing a line oscillator comprising a semiconductor switch, a control stage connected to the control electrode of said switch for receiving synchronizing signals and producing a switching signal therefrom, said switching signal having short switching pulses relative to a reference potential for closing said semiconductor switch, said reference potential being the potential applied to the control electrode of said switch during the absence of switching pulses, a source of comparison signals connected to said switch, said comparison signals being derived from said line oscillator, the closing of said switch producing a control voltage representing the phase relationship between said switching and comparison signals, a peak rectifier circuit connected between said source and said switch comprising a potential divider that establishes a threshold level in the amplitude of said comparison signals relative to said reference for maintaining said switch open during the absence of said switching pulses, a capacitor for receiving said control voltage and frequency control means connected between said capacitor and said source for using said control voltage to vary the frequency of said source to minimize differences in the phase relationships between said synchronous and comparison signals.

PO-1050
(5/69)

UNITED STATES PATENT OFFICE
CERTIFICATE OF CORRECTION

Patent No. 3,593,179 Dated July 13, 1971

Inventor(s) PAULUS J. M. HOVENS ET AL

It is certified that error appears in the above-identified patent and that said Letters Patent are hereby corrected as shown below:

IN THE TITLE PAGE change "68/5507" to -- 6815507 --;

Signed and sealed this 5th day of November 1974.

(SEAL)
Attest:

McCOY M. GIBSON JR.
Attesting Officer

C. MARSHALL DANN
Commissioner of patents